United States Patent [19]

Morris

[11] E Re. 29,779

[45] Reissued Sep. 26, 1978

[54] CHILD-PROOF AND PHARMACIST-ASSISTING REVERSIBLE CLOSURE FOR CONTAINERS

[76] Inventor: Glenn H. Morris, 4203 Highwood Dr., Chattanooga, Tenn. 37415

[21] Appl. No.: 760,520

[22] Filed: Jan. 19, 1977

Related U.S. Patent Documents

Reissue of:

[64] Patent No.: 3,865,267
Issued: Feb. 11, 1975
Appl. No.: 426,534
Filed: Dec. 20, 1973

[51] Int. Cl.[2] ..... B65D 55/02; B65D 85/56; A61J 1/00

[52] U.S. Cl. ..... 215/206; 215/214; 215/223; 215/224

[58] Field of Search ..... 215/201-226, 215/228, 319, 320, 321, 250-253; 220/287, 379; 138/96 R, 967

[56] References Cited

U.S. PATENT DOCUMENTS

| | | | |
|---|---|---|---|
| 2,487,728 | 11/1949 | Quiring | 215/213 |
| 3,025,988 | 3/1962 | Williams | 215/320 X |
| 3,044,648 | 7/1962 | Cohn | 215/213 |
| 3,269,576 | 8/1966 | Law | 215/208 X |
| 3,409,159 | 11/1968 | Velt | 215/213 |
| 3,432,058 | 3/1969 | Burgess | 215/206 |
| 3,606,074 | 9/1971 | Hayes | 220/287 X |
| 3,627,160 | 12/1971 | Horvath | 215/206 X |
| 3,744,654 | 7/1973 | Bromberg | 215/213 |
| 3,811,590 | 5/1974 | Hall, Jr. | 215/215 X |
| 3,831,796 | 8/1974 | Claasen | 215/204 X |
| 3,841,513 | 10/1974 | O'Conner et al. | 215/204 X |
| 3,868,037 | 2/1975 | Grossman | 215/211 X |
| 3,926,325 | 12/1975 | Benson | 215/206 |
| 3,974,938 | 8/1976 | Steadman | 215/250 X |

*Primary Examiner*—Stephen Marcus
*Attorney, Agent, or Firm*—Brady, O'Boyle & Gates

[57] ABSTRACT

A unitary reversible closure for containers of medicine and the like is applied in one position to the container to render the container child-resistant and in such position requires a complex manipulation [of the closure] to release it from the container. In a second position of application to the same container, the closure seals the container but requires only a simple manipulation by the pharmacist to release it from the container, thereby lessening irritation and discomfort to the pharmacist's fingers cause by manipulating closures or caps over a period of time and saving the pharmacist considerable time in removing closures over a period of time to fill the containers.

20 Claims, 18 Drawing Figures

FIG. 1
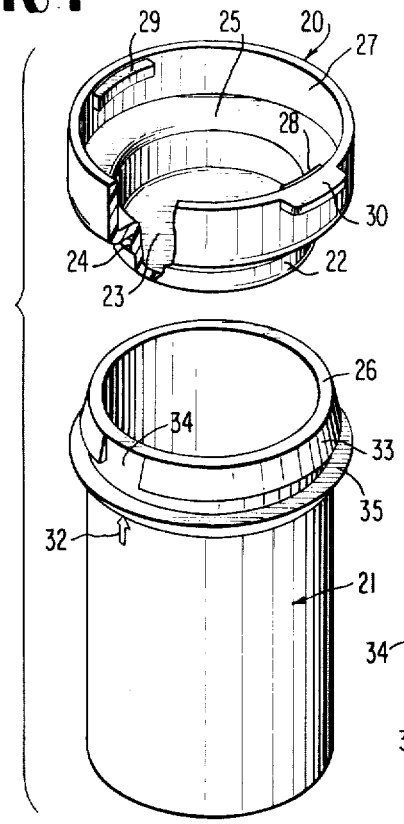
FIG. 2
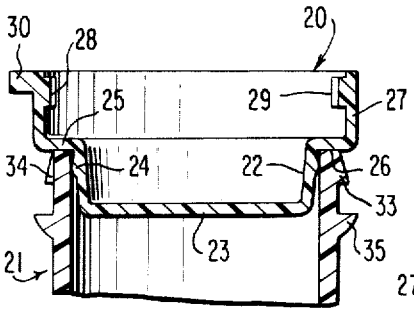
FIG. 3
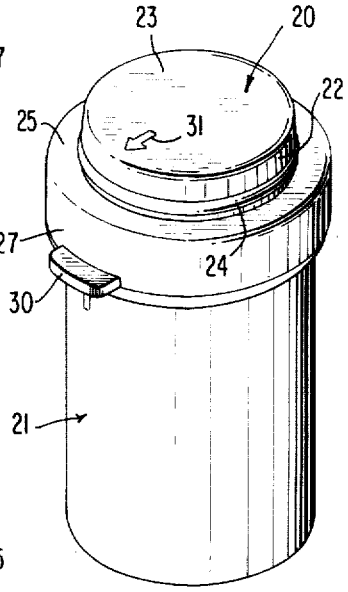
FIG. 4
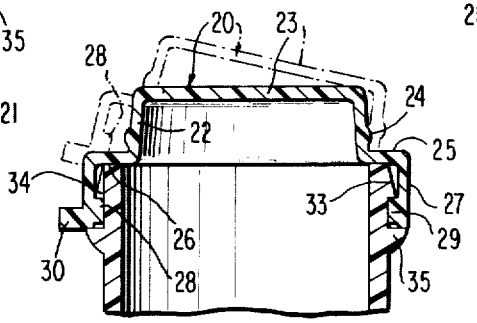
FIG. 5
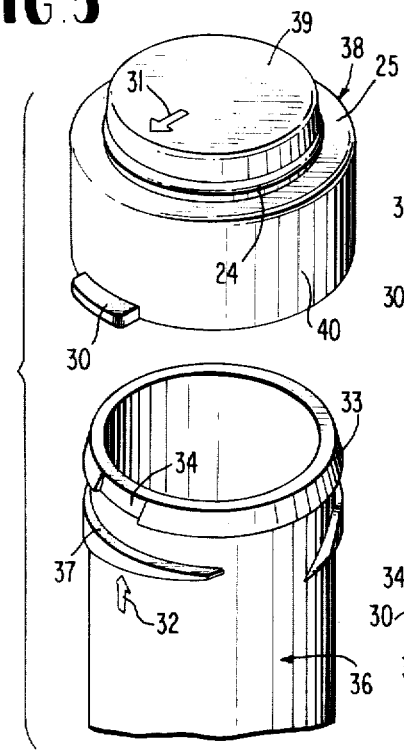
FIG. 6
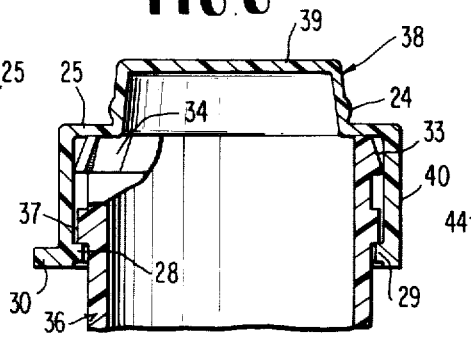
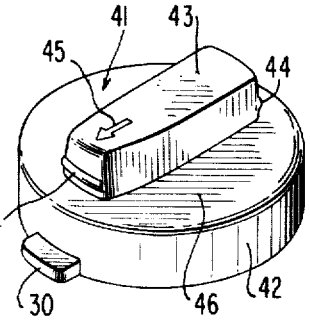
FIG. 8
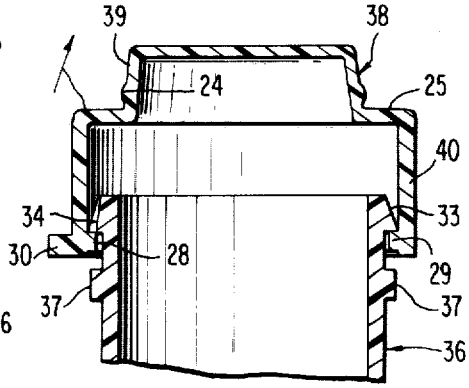
FIG. 7

FIG. 9
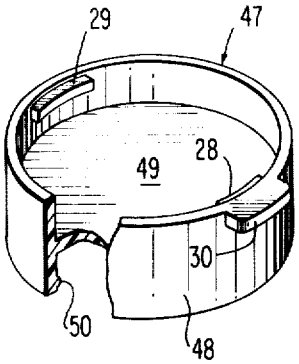
FIG. 10
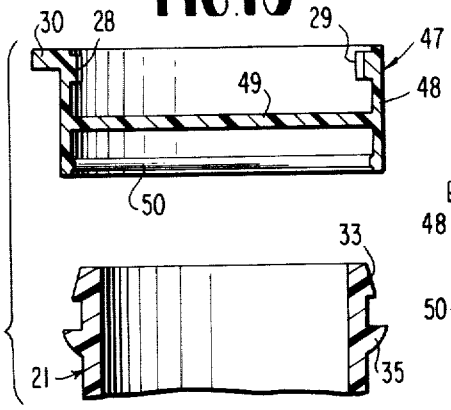
FIG. 11
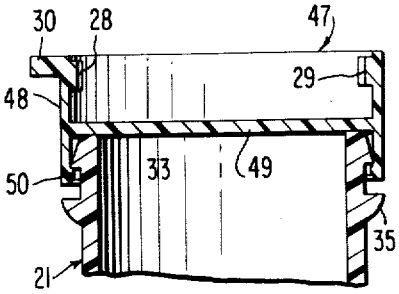
FIG. 12
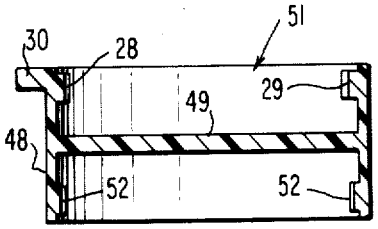
FIG. 14
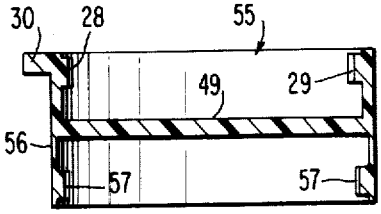
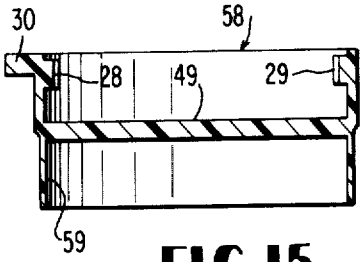
FIG. 15
FIG. 13
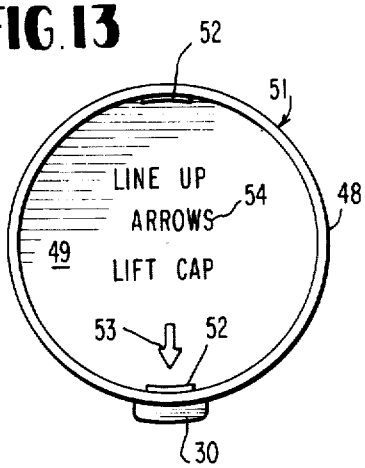
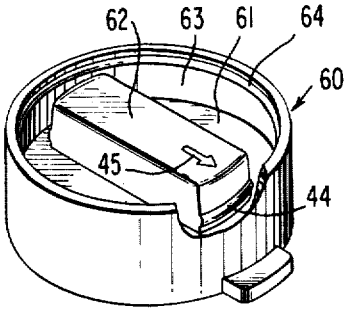
FIG. 16
FIG. 18
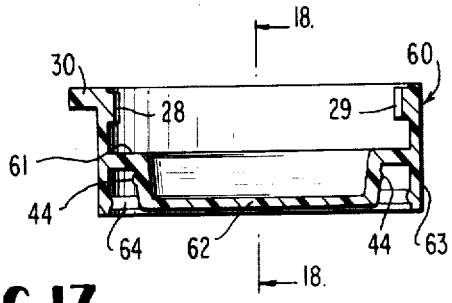
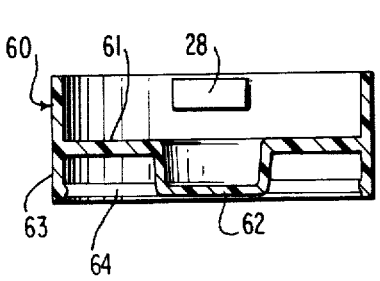
FIG. 17

CHILD-PROOF AND PHARMACIST-ASSISTING REVERSIBLE CLOSURE FOR CONTAINERS

Matter enclosed in heavy brackets [ ] appears in the original patent but forms no part of this reissue specification; matter printed in italics indicates the additions made by reissue.

BACKGROUND OF THE INVENTION

A new Federal law requires medicine containers to be equipped with child-resistant caps or closures to avoid injury or death to curious children who seek access to the contents of containers. Generally, the child-resistant closures which have been developed to satisfy the requirements of the law require a complex manipulation to release them from the containers, so that normally only an adult will be able to open the container of medicine or the like. The required complex manipulation of the closure is usually a plural step movement thereof, such as turning aligning and lifting, or pressing inwardly, turning and lifting, or some similar combination of manipulative steps. A typical example of the patented prior art relating to child-resistant closures for medicine containers is U.S. Pat. No. 3,432,058 of Mar. 11, 1969 which exhibits a closure or cap for medicine bottles which must first be rotated to align an internal lug thereof with a notch provided in a flange on the neck of the container, followed by a lifting of one side of the cap while the lug is aligned with the notch. Quite a large number of arrangements have been devised in the prior art to satisfy the requirements for a child-resistant closure for medicine containers and the above-identified patent is merely an illustrative example of the prior art.

It is customary in the interest of convenience and cleanliness of containers to supply medicine containers to pharmacists with the closure elements in place thereon. This avoids separation and loss of the parts and assures that the interiors of the containers are in a clean condition at the time of being filled. In the case of child-resistant closures, a rather serious problem has arisen in connection with the necessity for the pharmacist to constantly remove the safety closure from the container prior to filling the latter with medicine and reclosing it. This problem concerns increasing opening time and discomfort and irritation of the fingers of the pharmacist who must manipulate the closures during an entire working day. Because the child-resistant closures require a series of movements or steps to release them, and are purposely made difficult to manipulate for the protection of children, it takes the pharmacist longer to remove the safety closures from the containers and the pharmacist's fingers by the end of the day are frequently very sore and uncomfortable to the extent that some of the skin may actually be damaged and this slows him up even more in opening the containers and substantially reduces the number of containers he can fill in a day. This condition has led to many complaints by pharmacists and thus far no satisfactory solution to this annoying problem has come forth. With the safety closures a pharamicst can no longer fill the same number of medicine containers in a day as he could in the past and this is causing an increase in medicine cost to the consumer.

Accordingly, it is the objective of this invention to completely and satisfactorily solve the above-discussed problems of lost time and finger irritation through the provision of a uniquely constructed reversible or combination closure for medicine containers which is first applied to the container so as to seal the same against the entry of contamination and to maintain the container and its closure in assembled relationship prior to use. In this first applied position of the closure element, only a very quick and simple release procedure by the pharmacist is required for separating it from the container. This may consist of a simple pulling or twisting or lifting movement, such as that customarily required to remove a bottle stopper or simple snap or screw cap from a container. Such a procedure, even when repeated many times during the day, will not tend to cause any noticeable discomfort to the fingers, will not slow down the pharmacist, and will permit him to fill as many containers with safety caps as he has been able to fill in the past with non-safety caps.

In a second use position of the same closure on the same container following the removal of the closure in its first-applied position and the filling of container with medicine, the closure becomes a child-resistant safety closure which requires a more complex manipulation in order to separate it from the container. Thus, by means of the invention, a simply unitary reversible cap or closure alleviates the annoying problems of lost pharmacist time and finger irritation as commmonly caused by the constant handling of child-proof or safety caps. At the same time, due to the easy reversibility of the closure, the advantageous practice of furnishing containers and closures to pharmacists in assembled relationship is retained, and all of this without any appreciable cost increase. Additionally, in situations where no children are present, the combination cap embodying the invention has the added capability of being used as a simple stopper or cap without the safety feature.

It is a further object of the invention to provide any form of child-resistant medicine bottle closure with means for applying the closure to a container in a non-safety position for the stated purpose of eliminating finger irritation and discomfort and lost time in opening containers on the part of the pharmacist who must manipulate the closures time after time while filling prescriptions. In essence, therefore, the closure of the invention is a two-position closure for use on the same container which in a first position of use is easy and quick to separate from the container and in a second position of use is more difficult to separate from the container while providing the required child-resistant features.

Other features and advantages of the invention will become apparent during the course of the following description.

DESCRIPTION OF DRAWING FIGURES

FIG. 1 is an exploded perspective view, partly in cross section, showing a closure element embodying the invention and a coacting container.

FIG. 2 is a central vertical section showing the closure applied to the container in a first use position.

FIG. 3 is a perspective view showing the closure applied in a second use position to thereby constitute a child-resistant closure.

FIG. 4 is a central vertical section through the closure and container as shown in FIG. 3 and depicting in broken lines the removal of the child-resistant closure.

FIG. 5 is an exploded perspective view of a modified form of closure and container involving a combination screw-thread and snap-on mode of operation.

FIG. 6 is a central vertical section showing the assembled relationship of the closure and container of FIG. 5.

FIG. 7 is a similar sectional view illustrating the removal of the child-resistant closure from the coacting container.

FIG. 8 is a perspective view of a modified form of cap or closure which may be utilized instead of the caps illustrated in FIGS. 1 and 5.

FIG. 9 is a perspective view, partly in section, showing a modified type of reversible closure for medicine containers in accordance with the invention.

FIG. 10 is an exploded sectional view of the closure shown in FIG. 9 and a coacting container.

FIG. 11 is a further cross sectional view showing the closure of FIG. 8 assembled with the container in the first non-safety use position.

FIG. 12 is a central vertical section showing a further modified form of closure embodying the invention.

FIG. 13 is a bottom plan view of the closure shown in FIG. 12.

FIGS. 14 and 15 are similar cross sectional views showing two additional modifications of the invention.

FIG. 16 is a perspective view, partly broken away, of a closure embodying a further modification of the invention.

FIG. 17 is a central vertical section taken through the closure of FIG. 16 with the same inverted.

FIG. 18 is a vertical section taken on line 18—18 of FIG. 17.

DETAILED DESCRIPTION OF PREFERRED EMBODIMENTS

Referring initially to FIGS. 1 to 4 of the drawings, there is illustrated a reversible closure or cap 20 for a container 21 of a type adapted to receive medicines. The particular container 21 illustrated is of the general type disclosed in the aforementioned U.S. Pat. No. 3,432,058 and the invention embodied in the closure 20 has its child-resistant or safety aspect disclosed substantially in terms of the construction shown in said patent. However, it should be clearly understood that the invention which involves a two position reversible closure for the same container may employ as a part thereof any one of a variety of types of child-resistant constructions in combination with one or more of the structures according to the invention which adapt the closure for a non-safety application to the container for the convenience and comfort of the pharmacist who must manipulate the same.

More particularly, the closure 20 which is unitary and formed of a tough plastic, such as polystyrene, comprises a crowned generally cylindrical, although slightly tapered, plug or stopper section 22 having a flat end wall 23. The side wall of plug section 22 is preferably provided with an external annular bead 24 to promote a snug engagement and snap action when the plug section 22 is forced into the open mouth of container 21, as shown in FIG. 2.

The reversible closure 20 additionally comprises an enlarged flat annular wall 25 at the base of plug section 22 and projecting outwardly therefrom substantially at right angles to the side wall of the plug section. This wall 25 abuts the end face 26 of container 21 when the closure is applied thereto in either of its two use positions depicted in FIGS. 2 and 4. An annular cylindrical marginal wall 27 is attached integrally to the wall 25 in right angular relationshp thereto and is concentric with the plug or stopper section 22, as shown. If desired, the exterior face of the wall 27 may be grooved or knurled to facilitate grasping and twisting of the closure 20.

On the interior of the annular wall 27 and close to the open end of the hollow closure 20, there is provided a pair of diametrically opposed radially narrow arcuate lugs 28 and 29, the former of which is somewhat shorter circumferentially than the latter, for a reason to be described. Adjacent to the shorter lug 28, the closure 20 is equipped on the exterior of its wall 27 at its open end with a lift tab 30. In alignment with this lift tab and the adjacent shorter lug 28, an indicator 31 such as an arrow or dot is visibly marked on the end wall 23 of the closure for alignment during the removal of the child-resistant closure with a cooperating indicator 32 provided on the side wall of container 21.

This container, which may be cylindrical, is equipped adjacent to its open end with an exterior preferably tapered flange 33 having a single release notch 34 formed therein. A second annular flange 35 may be formed on the container 21 in axially spaced relation to the flange 33, the latter flange constituting the means for retaining the child-resistant closure in its position shown in FIGS. 3 and 4, prior to release of the closure by a series of relatively complex movements.

In use, the medicine container 21 and child-resistant closure 20 is supplied to the pharmacist in assembled relationship, with the plug or stopper section 22 pressed into the neck of the container as shown in FIG. 2. In such position, the closure seals the container and excludes contamination and the two parts are retained together to avoid misplacement or loss. In this first use position of the closure on the container 21, only a simple single manipulation by the pharmacist is required to separate the parts and this can be done without inconvenience and without discomfort to the fingers even where the operation must be repeated a large number of times during a working day. A mere twisting of lifting force exerted on the closure 20 will be sufficient to separate it from the container in this first applied position shown in FIG. 2.

After filling the container with medicine, the pharmacist inverts the closure 20 from its first use position and after aligning the indicators 31 and 32, simply presses the closure 20 down onto the container. The longer retainer lug 29 will easily engage under the retainer flange 33, and with the parts positioned as described, the shorter lug 28 will pass through the notch 34 and the wall 27 may bottom on the flange or shoulder 35. Following this, the closure 20 is rotated to shift the lug 28 out of alignment with the release notch 34. In order to remove the child-resistant closure from the second applied position shown in FIGS. 3 and 4, it is necessary to first rotate the closure to realign the lug 28 with the notch 34 and then to lift the adjacent side of the closure, utilizing the lift tab 30, and the closure will then separate from the container by rocking or pivoting around the lug 29 which is engaged below the flange 33. The lug 29 is too long to pass through the notch 34 and therefore the closure can be removed from the container only after adjustment to a rather precise location and after two separate and distinct types of manipulation. Children ordinarily will be unable to remove such a safety closure. However, the pharmacist can very simply separate the closure 20 from the container when the closure is in its initial use position without any discomfort or damage to the fingers. Thus the invention consists of a unitary reversible closure having two essential use or application positions on the same container, the first of these positions being a simple release position to avoid discomfort to the fingers of the pharmacist, and the second use position of the closure being a more difficult or complex release position to protect small children from poisoning.

In FIGS. 5 through 7, a modification of the invention is shown wherein the reversible two position closure, while in the child protecting position, is engaged with the container though a compound retaining means involving screw-threads in addition to the interlocking means already described relative to lugs 28 and 29 and the flange 33. More particularly, in FIGS. 5 to 7, a container 36 having the aforementioned retainer flange 33 and release notch 34 is additionally equipped below the flange with screw-threads or partial screw-threads 37. A cooperating closure 38 has a plug or stopper section 39 which is identical in construction and operation to the previously-described plug section 22 of closure 20. In the present embodiment, the exterior cylindrical wall 40 of the closure 38 is somewhat longer axially than the corresponding wall 27 in the prior embodiment and is provided internally with the identical lugs 28 and 29 which cooperate with the flange 33 and notch 34 in exactly the same manner described in the prior embodiment.

However, in connection with the embodiment in FIGS. 5 to 7, when the closure 38 is applied in the child-resistant position on the container 36, after the shorter lug 28 has been passed through the notch 34 and the closure engaged with the retainer flange 33, the same two lugs 28 and 29 coact with the screw-threads 37 when the closure is rotated to establish a threaded connection between the two parts, as shown in FIG. 6. To remove the safety closure, the same must be reversely turned to separate the threaded elements and the closure will then be released from the threads to the position shown in FIG. 7 where it is still retained by the lugs 28 and 29 in the same manner described in the prior embodiment. As in the prior embodiment, to separate the closure 38 from container 36, the closure must again be rotated to align the narrower lug 28 with the notch 34, FIG. 7, and then by lifting the tab 30, as previously described, the closure or cap will separate from the container. It will be understood that when the closure 38 is inverted, its plug portion 39 will enter the bore of the container in the identical manner shown and described in FIG. 2, and the resulting advantages of the invention in terms of child safety and relief of the pharmacist from finger discomfort are identical to the previous embodiment.

FIG. 8 shows a modified cap or closure 41 which may be utilized in either form of the invention shown in FIGS. 1 to 4, or 5 to 7. In this connection, the cylindrical body portion 42 of the closure may be constructed as illustrated to interlock with the container 21, or if preferred can be constructed to interlock with the container 36 having screw-threads. In either case, the generally cylindrical plug or stopper portion 22 or 39 is replaced by a bar-type generally rectangular plug portion 43 having bead segments 44 on its opposite ends to serve the same function as the annular bead 24. The plug portion 43 may have an indicator marking 45 or may be tapered itself to point toward the tab 30 and the cooperating indicator marking 32 on the container. When applied to the container in the first use position corresponding to FIG. 2, the bar-shaped element 43 engages the mouth of the container in the manner shown in FIG. 2 and the end wall 46 of body portion 42 abuts the end face 26 of the container. In the second use position for rendering the container child-resistant, the closure 41 functions in the manner described for the closure 20 or the closure 38, depending upon which embodiment of the safety structure is incorporated in the body portion 42. Actually as illustrated in FIG. 8, the body portion 42 contains the safety structure of the initial embodiment, FIGS. 1 through 4.

FIGS. 9 to 11 illustrate another form of closure cap 47 embodying the invention and being applicable reversely or in two positions to the previously-described container 21. In the safety or child-resisting position of the closure, not shown in FIGS. 9 to 11, the construction and operation is substantially identical to the initial embodiment. More particularly, the closure 47 comprises a cylindrical side wall 48 divided into two oppositely facing sections by a transverse wall or partition 49. On one side of this partition, the closure 47 is equipped with the previously-described elements 28, 29 and 30 which coact with the described elements 33 and 34 of the container 21 in the manner shown in FIGS. 1 to 4. On the other side of the partition 49, the closure 47 has its cylindrical wall provided with an internal annular bead 50 which is located close to the adjacent end of the closure. This bead is adapted to snap over the retainer bead 33 of the container whereby the wall 49 will abut the end of the container and the two parts will be assembled for easy separation by the pharmacist without finger discomfort. When the closure is reversed and applied on the same container 21, in the child-defeating mode, its removal will be more complicated, as described.

FIG. 12 shows a further modification of the invention wherein a container closure 51 constructed simiarly to the closure 47 possesses the same elements 28, 29, 30 and 49 already described. These elements coact with the container 21 to defeat child entry into the container as described previously. The opposite end of the container 51, however, in lieu of the bead 50, possesses a pair of equally sized diametrically opposed internal lugs 52 of slightly lesser radial thickness than the lugs 28 and 29. The thickness of the lugs 52 or the diametrical distance between them is such that the two lugs may snap over the flange 33 of the container when the closure 51 is applied thereto in the use position for easy release illustrated in FIG. 11 for the similar closure 47 having the snap bead 50.

FIG. 13 illustrates the face of the divider wall 49 remote from the safety structure and this face is visible to the user when applying the safety cap to a container or removing it. Consequently, this face of the wall 49 carries an alignment indicator 53 for the smaller lug 28 and suitable instruction indicia 54, if desired.

FIG. 14 shows a slight variation in a closure 55 of the construction in FIG. 12. In FIG. 14, the cylindrical wall portion 56 of the closure on the side of divider wall 49 remote from the safety structure is formed thin so as to be relatively flexible. In this instance, the two opposed identically-sized lugs 57 are relatively thicker radially than the lugs 52 although still thinner than the safety lugs 28 and 29. When applied over the container 21 or flange 33 as illustrated in FIG. 11, the thin wall portion 56 will yield to allow the lugs 57 to snap into easily releasable interlocking engagement with the flange 33.

FIG. 15 shows another modified cap or closure 58 whose safety section and components are also identical to the previously-described forms and therefore need not be redescribed. In this form of the invention, the means to retain the closure 58 in the first or non-safety use position for the convenience of the pharmacist, FIG. 11, consists of a relatively thin elastic cylindrical wall 59 on the side of the divider wall 49 remote from the safety structure. When applied over the flange 33 of the container, the thin wall 59 will bulge outwardly and form a snug but readily separable connection with the container so that the pharmacist can separate the closure easily from the container without finger discomfort. The instructional indicia 54 and indicator 53 shown in FIG. 13 is also applicable to the two embodiments of the closure shown in FIGS. 14 and 15.

FIGS. 16 to 18 show a further form of container closure possessing the same basic combination of the invention. More particularly, in these figures, the cap or closure 60 is equipped at one end with the described elements 28, 29 and 30, which form the essence of the child-defeating mode of operation. On the other end of the closure divided by a transverse wall 61, there is provided a bar-like plug or stopper element 62 similar to the element 43 in FIG. 8 and serving the same purpose as the element 43 during use in the manner illustrated by FIG. 2. In addition to the plug element 62, the same end of the closure 60 has an annular skirt or wall 63 provided with an internal annular bead 64 and these elements surround the bar-like plug 62 in spaced relation thereto as shown in the drawings. This arrangement enables the closure 60 to be applied to the container 21 in the first use position with the plug element 62 inside of the container neck, FIG. 2, and the skirt 63 external to the neck, FIG. 11, with the bead 64 engaged below the retainer flange 33. Again, the pharmacist may separate the closure from the container by a simple manipulation to save his or her fingers from discomfort.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A closure for containers defeating entry thereto by children and relieving finger discomfort by pharmacists who must separate closures from containers during container filling operations comprising a reversible closure body having first and second *independent* use positions on the same container, the first use position protecting the interior of the container from contamination and the second use position allowing the closure to defeat entry by children, a first retainer means on a portion of the closure which is coupled to the container in said first use position and being releasable therefrom by single simple manipulation of the closure, and a second retainer means on another portion of the closure which is coupled to the container in said second use position and requiring a complex manipulation of the closure consisting of at least two types of movement before separation of the closure from said container may be effected.

2. A closure for containers as defined by claim 1, wherein said first retainer means is a friction means which releases easily from the container by a simple force application, and said second retainer means is a positive interlocking detent means on the closure which cooperates with a positive locking element on a container and requires a movement of the closure to a position on the container where the detent means is aligned with a release passage in the locking element on the container before separation of the closure from the container can be effected with the closure in the second use position.

3. A closure for containers as defined by claim 2, wherein the first retainer means is a plug element on said closure body adapted to enter the mouth of a container and to be readily removable therefrom, and said second retainer means comprises a skirt section on the closure body applicable over the mouth of a container externally of the mouth, and interlocking lugs on the interior of said skirt section movable into positive locking engagement with said positive locking element on the container and separable therefrom by said movement of the closure to cause alignment of one of said lugs with said release passage.

4. The structure of claim 3, wherein said interlocking lugs are a pair of diametrically opposed lugs of unequal size with the smaller of said lugs only adapted to pass through said release passage, both lugs adapted for positive interlocking engagement with said locking element on the container when the closure is rotated to a position where the smaller lug is unaligned with said release passage.

5. The structure of claim 3, wherein the plug element is a substantially circular element which completely plugs the mouth of the container when placed therein.

6. The structure of claim 3, wherein the plug element is an elongated bar-like element rising from one end of said closure body and spanning a container mouth diametrically and only partially plugging it.

7. The structure of claim 2, wherein said first retainer means comprises a substantially annular skirt extension on the end of the closure which is remote from the second retainer means and said skirt extension appliable over the exterior of a container mouth to cover said mouth while the closure is in said first use position and while the second retainer means is in an inactive position.

8. The structure of claim 7, and yielding internal detent means on said skirt extension to interlock with said locking element on a container.

9. The structure of claim 8, and said internal detent means comprising an internal annular bead on said skirt extension.

10. The structure of claim 8, and said internal detent means comprising a pair of opposed lugs on the interior of the skirt extension.

11. The structure of claim 7, wherein said skirt extension is a thin walled annular extension adapted to snugly embrace and conform to the shape of said locking element on a container.

12. The structure of claim 2, wherein said first retainer means on the closure comprises a friction plug element on the end of the closure which is remote from the second retainer means and a substantially annular skirt extension on the last-named closure end surrounding the plug element.

13. The structure of claim 12, and the plug element consisting of a bar-like formation extending substantially diametrically on the closure.

14. The structure of claim 1, wherein the closure body comprises first and second separated container coupling parts, *on the same closure body* said first retainer means being on the first coupling part and the second retainer means being on the second coupling part.

15. The structure of claim 14, and a transverse divider wall separating the first and second coupling parts of the closure and said divider wall adapted to abut the end face of a container when the closure body is in said first or second use positions.

16. The structure of claim 4, wherein said lugs additionally comprise screw-threading elements on the closure adapted to cooperate with thread elements on a container inwardly of said container positive locking element.

17. A reversible closure having two *independent* positions of use on a container comprising a first coupling part on said closure adapted to engage a container in one use position of the closure wherein the closure protects the interior of the container from contamination, the first coupling part separating from the container by application thereto of a simple force, and a second coupling part on the closure having positive interlocking engagement with the container in the second position of use of the closure on the container, the second coupling part being releasable from the container only following a compound movement thereto relative to the container.

*18. A reversible closure having two independent positions of use on a container comprising a first coupling part on said closure adapted to engage a container in one use position of the closure wherein the closure protects the interior of the container from contamination, the first coupling part separating from the container by application thereto of a simple force, and a second coupling part on the closure having positive interlocking engagment with the container in the second position of use of the closure on the container and being releasable by complex manipulation, whereby said first coupling part is the only part closing the container in said one use position and said second coupling part is the only part closing the container in the second position of use.*

*19. A reversible closure having two independent positions of use on a container and being reusable in each of the two positions, comprising a first portion adapted to engage the container in one position of use and separable therefrom by a simple release manipulation, and a second portion constituting a safety closure having interlocking engagement with the container in a second position of use whereby said first portion is the only portion closing the container in said one position of use and said second portion is the only portion closing the container in the second position of use.*

*20. A reversible closure as set forth in claim 19 in which said first portion is adapted to plug the mouth of the container and said safety closure portion is adapted for engagement over the mouth of the container exterior of the mouth.*